United States Patent
Yoshigai

[11] Patent Number: 5,211,074
[45] Date of Patent: May 18, 1993

[54] HANDLE DEVICE FOR BICYCLES

[75] Inventor: Kenichi Yoshigai, Osaka, Japan

[73] Assignee: Yoshigai Kikai Kinzoku Co., Ltd., Osaka, Japan

[21] Appl. No.: 902,423

[22] Filed: Jun. 24, 1992

Related U.S. Application Data

[63] Continuation of Ser. No. 608,342, Nov. 2, 1990, abandoned.

[30] Foreign Application Priority Data

Nov. 22, 1989 [JP] Japan .................. 1-135682[U]

[51] Int. Cl.$^5$ .................. B62K 21/12; B62M 1/02
[52] U.S. Cl. .................. 74/551.8; 74/551.1; 74/502.2; 280/261
[58] Field of Search .................. 74/551.1-551.8, 74/502.2; 272/73; 280/261

[56] References Cited

U.S. PATENT DOCUMENTS

| 4,750,754 | 6/1988 | Lennon | 74/551.1 |
| 4,878,397 | 11/1989 | Lennon | 74/551.8 X |
| 4,930,798 | 6/1990 | Yamazaki et al. | 74/551.1 X |
| 4,951,525 | 8/1990 | Borromeo | 74/551.8 X |
| 5,000,469 | 3/1991 | Smith | 74/551.1 X |

FOREIGN PATENT DOCUMENTS 2535669  5/1984  France .................. 74/551.1

OTHER PUBLICATIONS

The Only Ergonomically Engineered Adjustable Handlebar, Profile, 6600 W. Armitage Avenue, Chicago, Illinois 60635, 1990, Scott Aerodynamic Handlebars Publication.

Primary Examiner—Vinh T. Luong
Attorney, Agent, or Firm—Sixbey, Friedman, Leedom & Ferguson

[57] ABSTRACT

In a handle bar comprising a horizontal straight portion fixed at its center a stem, a pair of U-shaped portions bent from the straight portion forming first grip-holders, a pair of elongated portions extended upward slantingly from the U-shaped portions toward the front center, the elongated portions being connected with a connecting member forming second grip-holders, the bar in its entirety being a substantial isosceles triangle seen from the above, brake levers and speed change levers are collectively provided on the connecting member. Both levers can be operated simply with wrist actions while arms are placed on elbow rests provided at the straight portion of the handle bar.

9 Claims, 3 Drawing Sheets

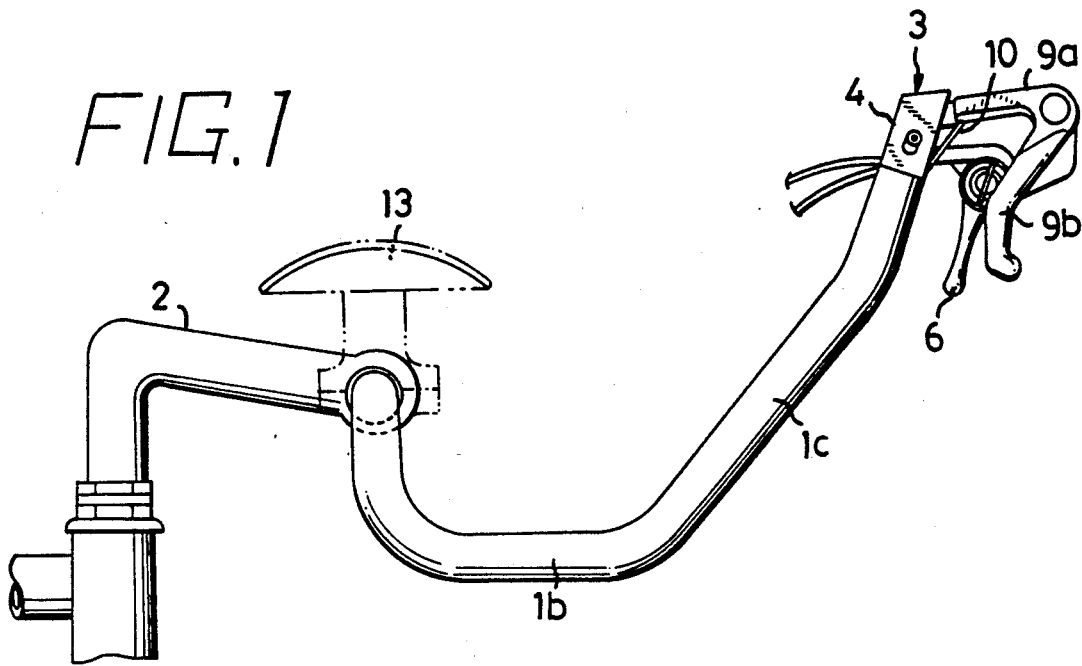
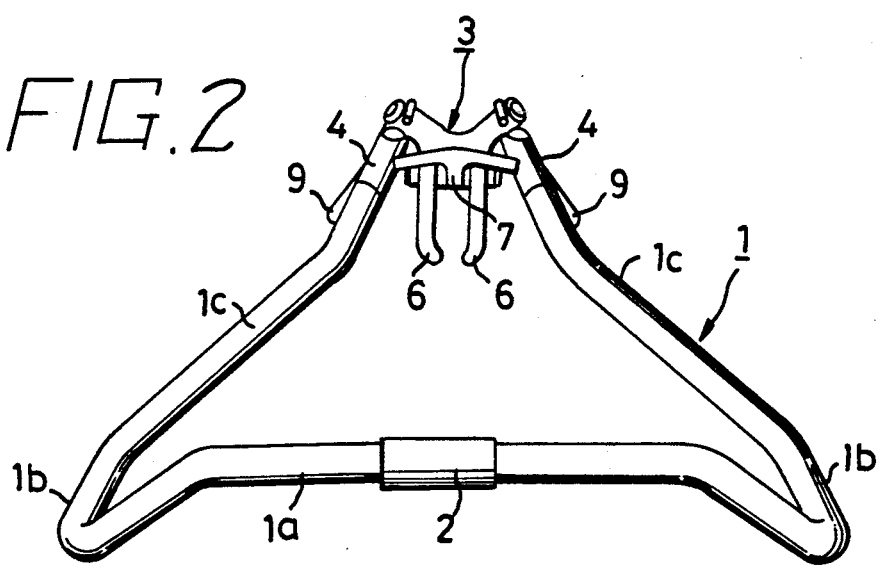

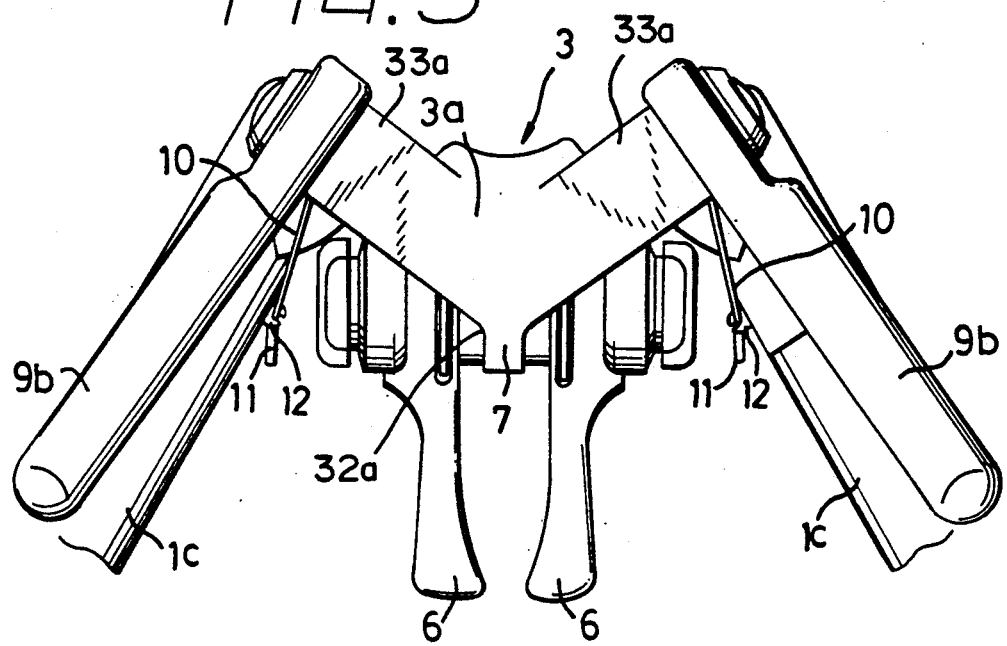
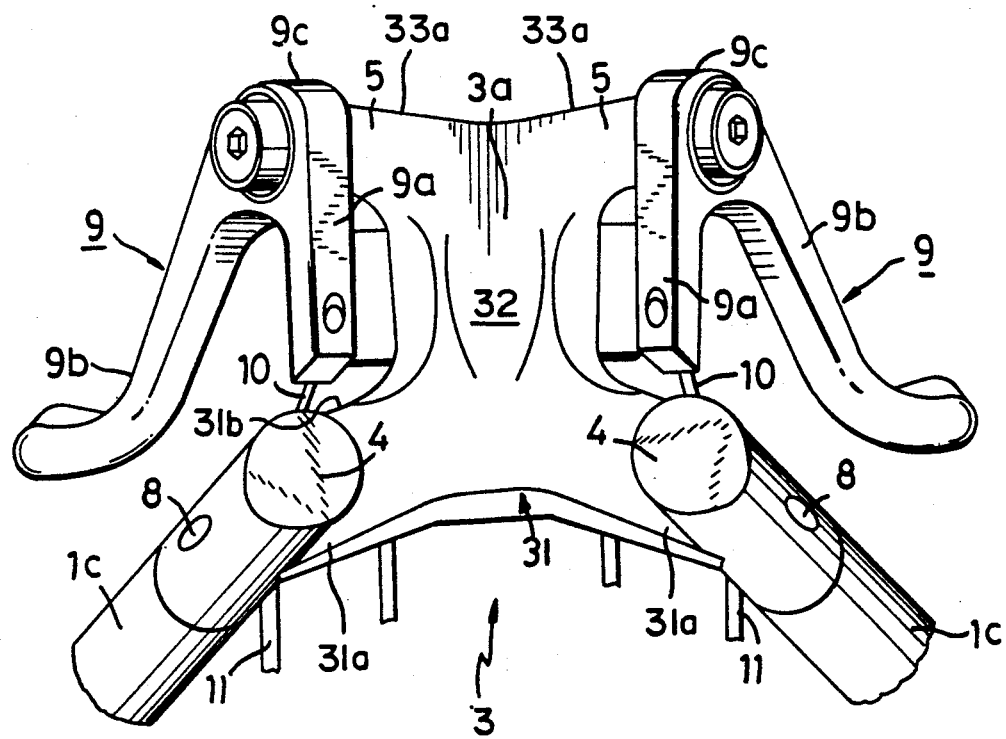

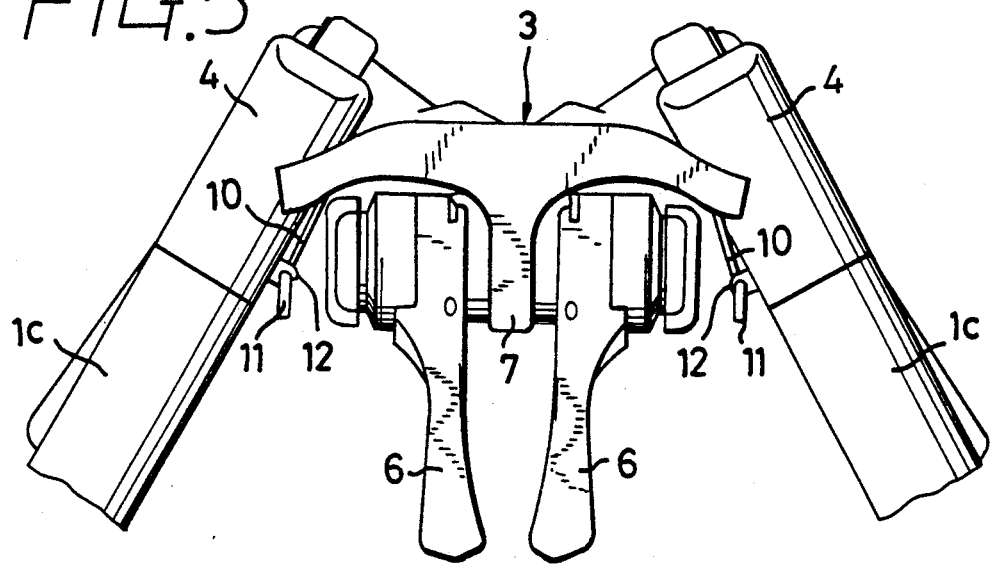
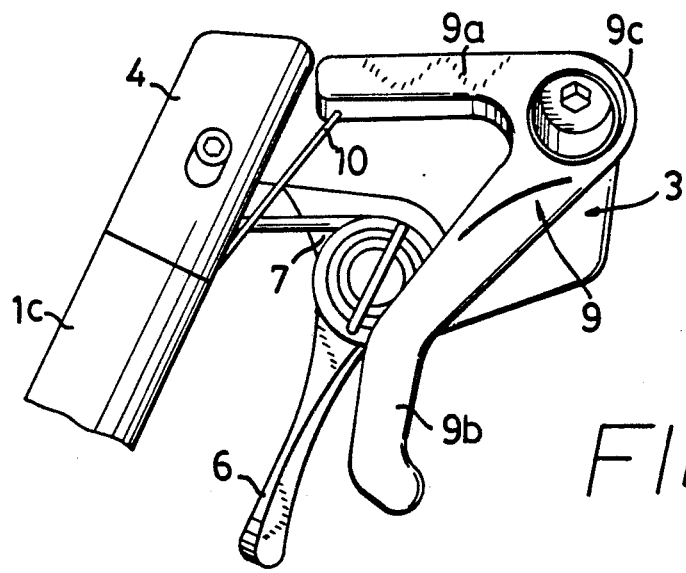
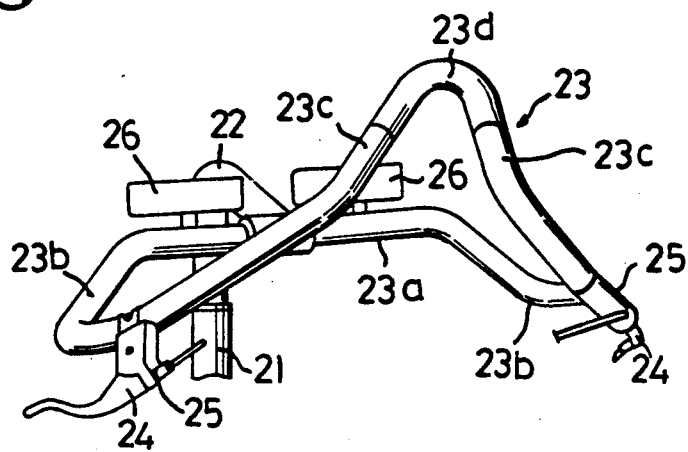

HANDLE DEVICE FOR BICYCLES

This application is a continuation of Ser. No. 07/608,342, filed Nov. 2, 1990, now abandoned.

FIELD OF THE INVENTION AND RELATED ART STATEMENT

The present invention relates to a handle device for a bicycle.

For example, what is shown in FIG. 7 is known as the handle device for a bicycle for use in a triathlon race. The handle bar 23 shown in FIG. 7 comprises a horizontal and straight portion 23a connected at its center to a stem 22 which is fixed at its lower end on a steering column 21, U-shaped portions 23b which are extended from both ends of the straight portion 23a bent downward and outward slantingly forming the first grip-holders, and a pair of elongated portions 23c extended upward slantingly from the U-shaped portions 23b toward the front center, tips of both elongated portions 23c being connected with a connecting member 23d of an inverted U-shape and forming the second grip-holders, and the handle bar in its entirety being substantially isosceles triangle seen from the above. Brake levers 24 are fixed via brackets 25 on positions adjacent to the first grip-holders. Also, elbow rests 26 are provided at both sides of the stem which connects the straight portion 23a of the handle bar 23 with the steering column.

Triathlon race is a very severe game which includes swimming, bicycle racing and marathon. In particular, the bicycle racing covers and extremely long travel distance and is the part where an athlete spends his physical strength most.

A triathlon bicycle possesses a handle device of a peculiar structure as mentioned above, which is different from a conventional one. This handle device facilitates selections of rip positions depending on the conditions or purposes of the travel; for example, when the speed is shifted from low to high or when the bicycle starts climbing uphill from the flat ground, the athlete can forcefully step on pedals upon grasping the first grip-holders on the right and the left and erecting his upper body, or when it runs at a high speed on a straight course or a downhill road, the athlete can place his elbows on elbow rests 26 and grasp the second grip-holders at the tip of the elongated portions 23c holding down the upper body so as to received least air resistance and make a stable run.

When the athlete grasps the second grip-holders of such a handle device, the bicycle travels at a high speed with great necessity for frequent braking, and furthermore when braking becomes necessary, the athlete has to once move his hands off the handle bar in order to operate the brake lever 24, which can cause an accident by a fall-down due to unstable braking operations. Of further importance is the fact that the athlete keeps his elbows on elbow rests 26 during high speed travel and that it consumes more of his physical strength to remove his elbows from elbow rests 26 and operate brake levers 24 in order to effect braking.

On the other hand, the speed change lever for gear shifting, not shown in the drawing, is installed at the upper part of the lower pipe, and its operation and action are similar to those of the brake levers. In any case, repetitious operations of these devices will consume much of one's physical strength and greatly affect his condition during the next part of the game, marathon.

Also, since the conventional brake lever and speed change lever are installed as independent parts, the number of parts is increased.

OBJECTS AND SUMMARY OF THE INVENTION

The first object of the present invention is to improve the braking operability mainly during high speed travel and to prevent exhaustion of physical strength as much as possible by collectively installing brake levers and speed change levers on a connecting member in a handle device comprising a handle bar of the above form, and the second object is to decrease the number of parts for lever attachment by collectively installing brake levers and speed change levers on a connecting member.

The invention is that in a handle device for bicycles including a handle bar, the handle bar comprising a horizontal straight portion connected at its center to a steering column by means of a stem having a lower end fixed to the column, a pair of U-shaped portions bent downward and outward slatingly from both ends of the straight portion forming the first grip-holders, and a pair of elongated portions extending upward slatingly from the U-shaped portions toward the front center, tips of the elongated portions being connected with a connecting member forming the second grip-holders, the device characterized in that a pair of brake lever mount portions 5 is provided at both sides of the front part of the connecting member 3 and a pair of brake levers 9 are mounted thereon.

At the lower part of the connecting member 3 is provided a support portion 7 on which a pair of speed change levers 6 is mounted.

In driving a bicycle equipped with a handle device of the above structure, during high speed travel wherein both elbows of the driver are placed on elbow rests 13 of the handle bar 1 while his hands grasp the second grip-holders, the driver can effect braking upon operating brake levers 9 and speed change levers 6 simply by wrist motions without removing hands from the handle lever 1 and without making other wasteful movements of the body, and, thus, the operation is carried out accurately and safely without a loss of the driver's physical strength. Since brake levers 9 and speed change levers 6 are attached collectively on mount portion 5 and the support portion 7 formed on the connecting member 3 which connects the tips of the handle bar 1, the number of parts s decreased, having the connecting member 3 also act as the mounting parts for brake levers 9 and speed change levers 6 on the handle bar 1.

BRIEF DESCRIPTION OF THE DRAWINGS

FIGS. 1 through 5 illustrate embodiments of the present invention.

FIG. 1 is a general side view;
FIG. 2 is a perspective view of the handle device seen from the rear;
FIG. 3 is a main front view;
FIG. 4 is a main plan view;
FIG. 5 is a main rear view;
FIG. 6 is a main side view; and
FIG. 7 is a perspective view showing a conventional device.

DESCRIPTION OF THE PREFERRED EMBODIMENTS

In FIGS. 1 through 6, indicated at 1 is a handle bar of a bicycle, wherein a horizontal straight portion 1a of the bar 1 is fixed by a stem 2 whose lower end is fixed to the steering column. The shape of the handle bar 1 is such that from both ends of the straight portion 1a extends a pair of U-shaped portions 1b bent downward and outward slantingly forming the first grip-holders, and further in continuation to these U-shaped portions 1b is a pair of elongated portions 1c almost straight in shape extending upward slantingly toward the front center in front of the stem 2. The elongated portions 1c are of the same length and their tips are positioned substantially to each other and are connected with a connecting member 3. Therefore, as shown in a plan view of FIG. 2, the handle bar is a substantially isosceles triangle having the straight portion 1a as the base and elongated portions 1c, 1c as oblique sides. On the straight portion 1a is provided a pair of elbow rests 13 at both sides of the connecting stem 2. However, the above structure has been known conventionally and contains no novelty.

In the present invention, an improvement is made of the connecting member 3. The connecting member 3 consists of a block member 3a, which is almost in an H-shape plan. The H-shaped block member 3a has a rear part 31, which forms rear legs 31a of the H-shape, a projecting part 32, which projects forwardly from a front side 31b of the rear part 31, and a front part 33, which forms forward legs 33a of the H-shape (FIG. 4). At the ends of the rear part 31, which form rear legs 31a of the H-shape, are provided a pair of fitting portions 4 in the shape of caps that fit in the tips of the elongated portions 1c of the handle bar 1, and the ends of the forward legs 33a provide a pair of brake lever mount portions 5, 5. Also provided, at the center of the lower side 32a of projecting part 32 of the block member 3a, is a support portion 7 to which speed change levers 6 are mounted.

The cap-shaped fitting portions 4 on the connecting member 3 are fitted in the tips of the elongated portions 1c of the handle bar 1 and are fixed with bolts 8. On the other hand, brake levers 9 are pivotally supported on the brake lever mount portion 5 projected in a horn-shape from both ends of the front part of the block member 3a. The brake lever 9 is of a substantially V-shape consisting of a short bar 9a and a long bar 9b which is the operational part. The bent portion 9c is pivotally supported to the lever mount portion 5, and to the tip of the short bar 9a is engaged an end of an inner wire 10 of a Bowden wire which is connected to the braking device, not shown in the drawing. An end of an outer wire 11 of the Borden wire is connected to an outer wire receptacle 12 projecting from the fitting portion 4 of the connecting member 3.

Further, the block member 3a is provided with a support portion 7 projected downward from its lower center, the support portion 7 being provided with a pair of speed change lever 6 having an operating portion inclined substantially downward, the speed change levers 6 being connected to a gear shift device not shown in the drawing. Indicated at 13 is an elbow rest provided in a pair at both sides of the connecting stem 2 on the straight portion 1a of the handle bar 1.

What is claimed is:

1. A handle device for bicycles including a handle bar, the handle bar comprising a horizontal straight portion for connection at its center to a steering column by means of a stem having a lower end for fixing to the column, a pair of U-shaped portions bent downward and outward slantingly from both ends of the straight portion forming first grip-holders, and a pair of elongated portions slanting upward from the U-shaped portions toward a front center, tips of the elongated portions being connected with a connecting member, said connecting member having a rear part which extends crosswise between the tips of the elongated portions and forms second grip-holders and having a projecting part which projects forwardly relative to a front side of the rear part of the connecting member, and the handle bar in its entirety being a substantial isosceles triangle seen from the above, wherein a pair of brake lever mount portions is provided on laterally opposite sides of the projecting part of the connecting member and a pair of brake levers are mounted on said projecting part forwardly of the handle bar and the crosswise extending rear part of the connecting member.

2. A handle device for bicycles as defined in claim 1, wherein the connecting member is provided with a support portion on a lower side of the projecting part thereof, the support portion being provided with a pair of speed change levers.

3. A handle device for bicycles as defined in claim 1 or 2, wherein the connecting member is provided with a pair of fitting portions in the shape of a cap at both ends of the rear part thereof, said fitting portions fitting in the tops of the elongated portions of the handle bar.

4. A handle device for bicycles as defined in claim 1 or 2, wherein the brake lever mount portions project in a horn-shape at laterally opposite sides of the projecting part of the connecting member.

5. A handle device for bicycles as defined in claim 1 or 2, wherein each brake lever is of a substantial V-shape comprising a short bar and a long bar for operation, a bent portion thereof being pivotally supported on a respective one of the brake lever mount portions, a tip of the short bar being engaged with an end of an inner wire for connection with a brake device.

6. A handle device for bicycles as defined in claim 2, wherein the support portion projects downward from a lower center part of the projecting part of the connecting member; and wherein an operating portion of the speed change levers is inclined substantially downward so as not to interfere with the brake levers.

7. A handle device for bicycles including a handle bar, the handle bar comprising a horizontal straight portion for connection at its center to a steering column by means of a stem having a lower end for fixing to the column, a pair of U-shaped portions bent downward and outward slantingly from both ends of the straight portion forming first grip-holders, and a pair of elongated portions slanting upward from the U-shaped portions toward a front center, tips of the elongated portions being connected with a connecting member, said connecting member having a rear part which extends crosswise between the tips of the elongated portions and forms second grip-holders and having a projecting part which projects forwardly out form a front side of the rear part of the connecting member; wherein a pair of brake lever mount portions and at least one speed change lever mount portion are disposed on the projecting part of the connecting member; and wherein a pair of brake levers and at least one speed change lever are mounted on said projecting part of the connecting member, forwardly of the handle bar and the crosswise extending rear part of the connecting member, with operating portions of the brake and speed change levers being disposed in proximity to each other.

8. A handle device for bicycles according to claim 7, wherein said connecting member is generally H-shaped when viewed from above, wherein the rear part forms rearward legs of the H-shape, each rearward leg of the H-shape forming means for connecting the connecting member to a respective one of the tips of the elongated portions of the handle bar; wherein the projecting part forms a central portion of the H-shape which extends between the forward legs and rearward legs of the H-shape; wherein each forward leg of the H-shape is provided with one of said brake lever mounts; and wherein said at least one speed change lever is provided on the central portion of the H-shape that extends between the forward and rearward legs thereof.

9. A handle device for bicycles according to claim 8, wherein said at least one speed change lever mount is mounted rearwardly and below said brake lever mounts.

* * * * *